J. R. JOHNSON.
DRUM TYPE CONTINUOUS MILLING MACHINE.
APPLICATION FILED AUG. 30, 1920.
1,414,812.
Patented May 2, 1922.
4 SHEETS—SHEET 1.
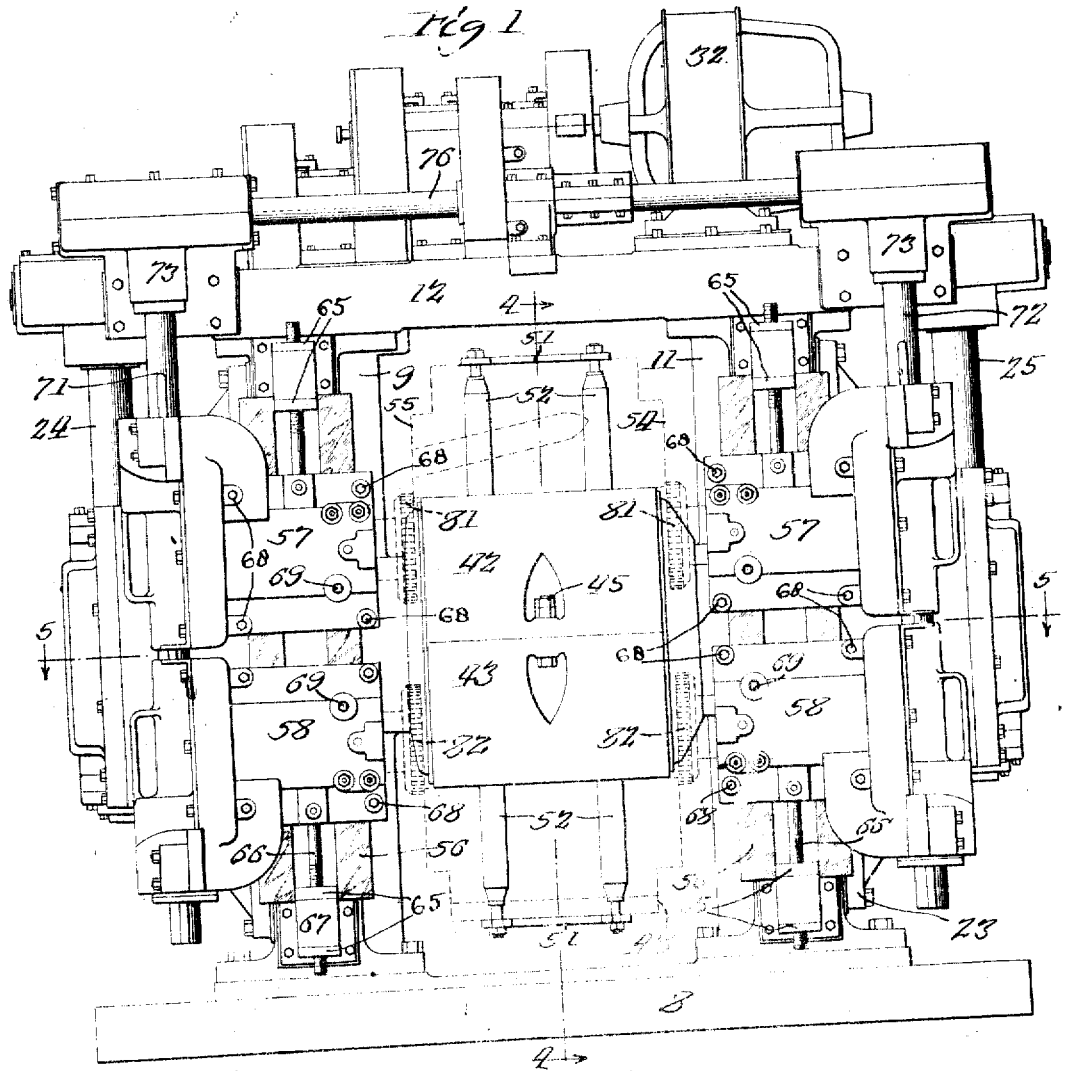
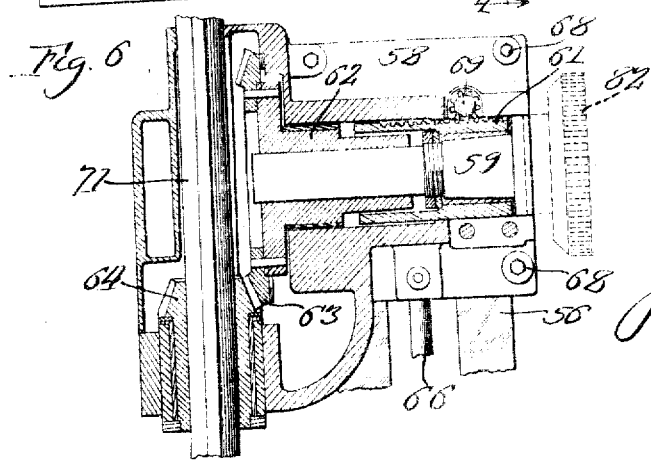
INVENTOR.
John R. Johnson
BY Ira J. Wilson
ATTORNEY.

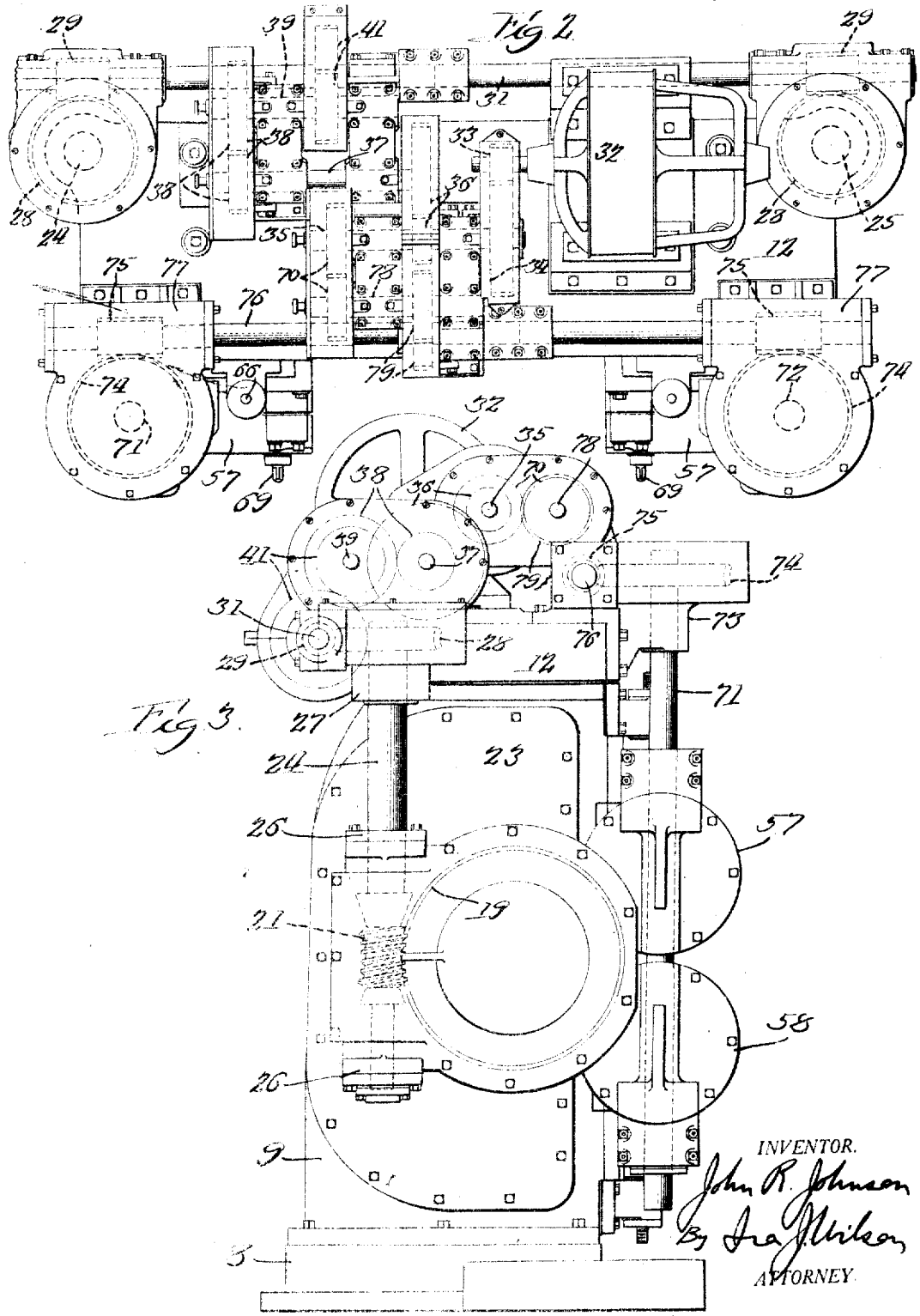

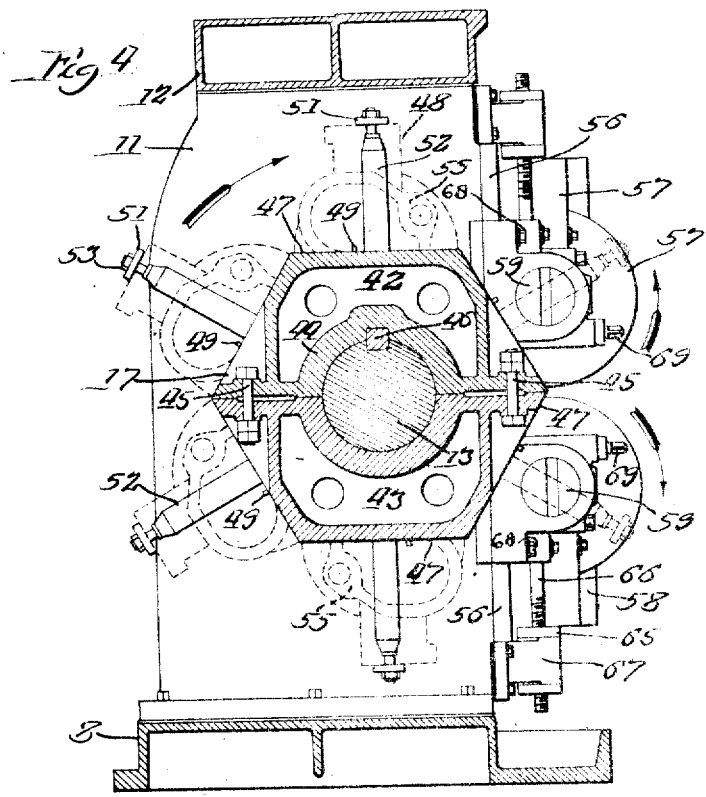
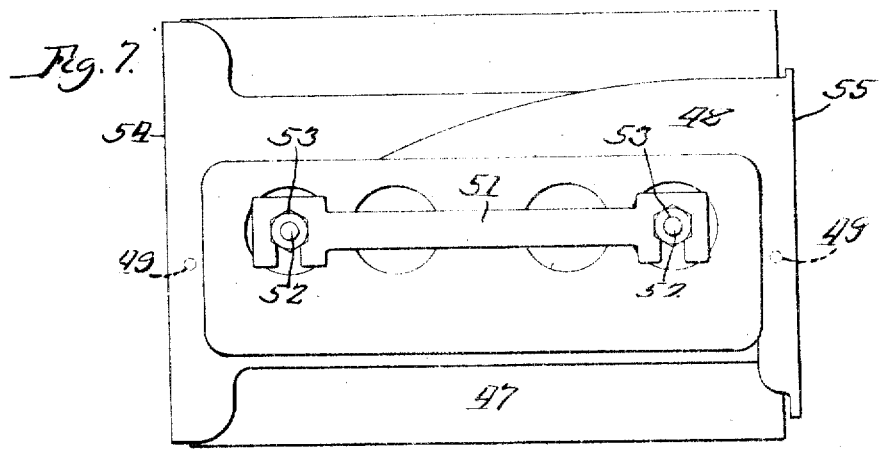

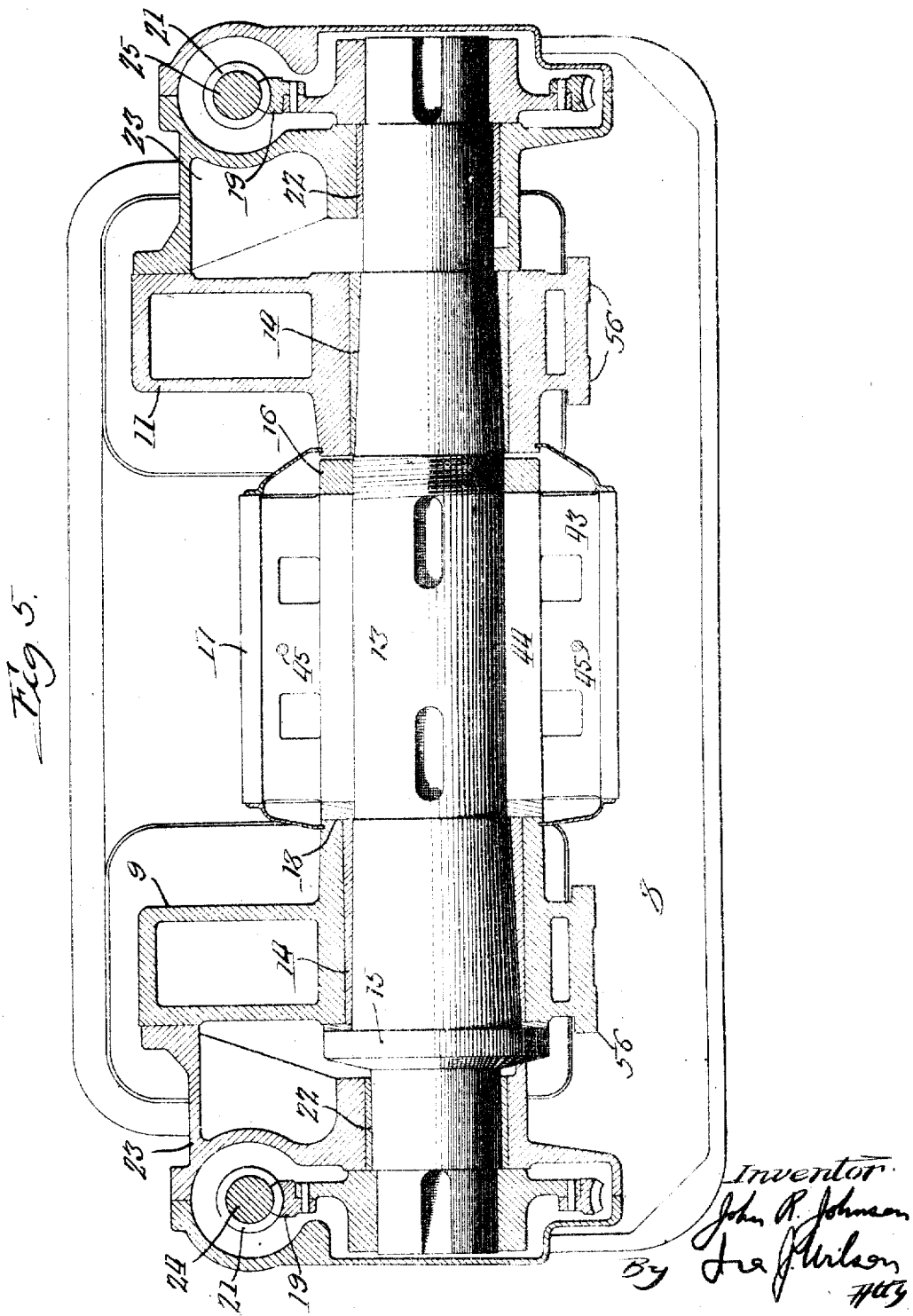

UNITED STATES PATENT OFFICE.

JOHN R. JOHNSON, OF ROCKFORD, ILLINOIS, ASSIGNOR TO THE INGERSOLL MILLING MACHINE COMPANY, OF ROCKFORD, ILLINOIS, A CORPORATION OF ILLINOIS.

DRUM-TYPE CONTINUOUS-MILLING MACHINE.

1,414,812. Specification of Letters Patent. Patented May 2, 1922.

Application filed August 30, 1920. Serial No. 406,924.

*To all whom it may concern:*

Be it known that I, JOHN R. JOHNSON, a citizen of the United States, residing at Rockford, in the county of Winnebago and State of Illinois, have invented certain new and useful Improvements in Drum-Type Continuous-Milling Machines, of which the following is a specification.

This invention pertaining in general to the art of milling machines has more particular reference to the drum type continuous milling machines, so called, because a work-carrying drum or table is continuously revolved and carries the work-pieces in succession past the milling cutters. By reason of this construction, it is not necessary to stop the machine to change the work pieces, since the rotation of the drum is continuous and the operator removes the finished castings at a loading station and replaces them with rough castings.

One of the primary objects of this invention is to provide a drum type continuous milling machine of novel construction which shall enable accurate and economical production in the surface milling of castings. The novel design and organization contemplated by this invention, while being particularly efficient for the handling of large work pieces, such as motor castings, is nevertheless, equally well adapted for surface milling various other parts. The principles involved herein are, however, best suited to what might be termed a single purpose machine, and in this sense it should be understood that where production warrants, the machine should be especially designed for each particular purpose so as to possess those characteristics most efficient for the purpose in mind.

Another important object of my invention is to provide a drum type milling machine having a work-carrying drum and cutter spindles mounted on spaced upright housings so as to insure rigidity between the work and cutters and to promote smooth cutting and economy in milling operations. More particularly, I have provided a milling machine characterized by spaced upright housings held in rigid relation, a work-carrying drum supported for rotation upon and between the housings and adapted for carrying work-pieces in circumferentially spaced relation so that when the drum is revolved the work pieces may be loaded at one side of the machine, and cutters so mounted on the housings as to mill the work-pieces as they are carried in succession past the cutters and so as to be accessible from the side of the machine opposite from the loading station.

I have further aimed to provide a machine of this character of heavy and sturdy design with the parts so organized as to insure absolute rigidity in order that heavy surface milling operations may be accurately and expeditiously performed.

My invention also contemplates the provision of a continuous milling machine of the drum type embodying novel mechanism for driving the work-carrying drum and the cutter spindles.

Still another object is to provide in a milling machine, a pair of roughing and finishing cutter spindle heads or saddles so arranged that the cutters of each pair simultaneously engage opposed surfaces of a work-piece as it is moved between the cutters by the rotating drum; and to provide for adjustment of these cutter spindle heads with respect to the axis of rotation of the drum for the purpose of accommodating such cutters to the path of the work to be surfaced.

Other objects and attendant advantages will be appreciated by those familiar with this art as the invention becomes better understood by reference to the following description when considered in connection with the accompanying drawings, in which—

Figure 1 is a front elevation of a continuous milling machine embodying my invention;

Fig. 2, a plan view of the machine;

Fig. 3, an end elevation of the machine looking at the left-hand end of Fig. 1;

Figs. 4 and 5, sectional views taken substantially on lines 4—4 and 5—5 of Fig. 1, with the lower spindle heads removed in Fig. 5.

Fig. 6, a fragmentary vertical sectional view taken centrally through the lower left hand cutter head shown in Fig. 1; and Fig. 7, an enlarged top view of a motor casting clamped to the drum in position to be milled.

In the present application, my invention is embodied in a machine particularly designed for surface milling the opposite ends of a motor casting, by roughing and finishing operations. In this case, the roughing and finishing cutters simultaneously mill two castings, that is, while one casting is passing between and being surfaced by the roughing cutters another is passing between the finishing cutters. In view of the relatively large size of these castings and of the difficulties imposed when milling such large surfaces at one time, it is imperative in order to obtain accuracy and large production with a machine occupying a small floor space, that the operating parts shall be arranged in a most practical co-operative relation and so constructed and proportioned as to transmit the required forces directly and efficiently. It will be manifest, therefore, to those familiar with this art, that by the provision of suitable fixtures on the work-carrying drum, castings or work-pieces of various other shapes and proportions might be surface-milled with a machine of this type, especially in view of the fact that a considerable range of adjustment may be had to position the cutters in proper relation to the work; and in the event that a particular work-piece warrants large production, my invention contemplates the provision of a special-purpose machine for such work, embodying the principles of invention herein disclosed.

In the present embodiment, the machine comprises generally stated, a bed plate 8 upon which is rigidly mounted in laterally spaced relation, a pair of upright columns or housings 9 and 11 rigidly joined at their upper ends by a top plate 12. A main drum shaft 13 interposed between and journaled in bearings in the housings 9 and 11, carries therebetween a work drum or table peripherally equipped with a plurality of fixtures for carrying work-pieces in circumferentially spaced relation. Upon each side housing is mounted for vertical adjustment, a pair of spindle heads, one carrying a roughing cutter and the other a finishing cutter; and these heads are so arranged in opposed relation that the roughing cutters will simultaneously mill end surfaces on each work-piece as it is moved between the cutters, and at the same time the roughmilled surface on the next preceding workpiece will be finished by the finishing cutters. Suitable mechanism is provided for simultaneously revolving the drum shaft and cutters at appropriate speeds so that the operation is automatic, except for loading and unloading.

Referring now more particularly to Fig. 5 of the drawings, it will be observed that the side columns or housings 9 and 11 are of the hollow column type and that each is shaped to provide substantially midway of its height a horizontal bearing 14 of substantial length in which the main drum shaft 13 is journaled. It will also be observed that this drum shaft is of very substantial proportions for carrying the heavy castings and transmitting the powerful feed necessary to effect the heavy surface milling operations without vibration. This shaft equipped with an annular locating collar 15 bearing against the outer side of the housing 9, is held against axial displacement by a nut 16 threaded on the shaft for holding the work-carrying drum 17 against the inner shoulder 18 of the housing 9. The drum shaft has fixedly mounted on each outer end a worm gear 19 meshing with a worm 21; and additional bearings 22 are provided for the drum shaft between the worm wheels and the adjacent housings, these bearings being supported by suitable brackets 23 bolted to the outer sides of the respective housings. The worms 21 are fixed to and driven by vertical shafts 24 and 25 journaled at their lower ends in suitable bearings 26 attached to their respective brackets 23 which latter serve also to provide suitable casings for the worm gears. The upper ends of these shafts 24 and 25 respectively journaled in bearings 27 carried by the top plate 12, are equipped with worm gears 28 meshing with worms 29 fixed to a horizontal shaft 31, also journaled in bearings carried by the top plate. This shaft 31 is driven through a suitable chain of reduction gearing from an electric motor 32 mounted on the top plate. The train of gearing shown comprises a motor pinion 33 meshing with a gear 34 fixed to a shaft 35 which shaft is in driving connection with the shaft 31 through the intermediary of gears 36, shaft 37, gears 38, shaft 39 and gears 41. It is, of course, obvious that any suitable means may be employed for driving the shaft 31, the gearing shown being particularly adapted for the present machine. By means of this drive the work drum will be slowly revolved in a feed movement in a clockwise direction, viewing Fig. 4.

The work-carrying drum or table 17 is of sectional construction comprising in this instance, two half sections 42 and 43 shaped to jointly provide a hub 44 fitting the central portion of the shaft 13 and clamped thereto by means of bolts 45. Suitable means may be employed for effecting a rigid driving connection betwen the drum and shaft as by means of keys 46. The drum is shaped on its periphery to provide a plurality, six in the present case, of work-supporting tables or surfaces 47 upon which the work-pieces 48 may be secured by suitable fixtures. In the present example, the work-pieces in the form of motor castings are located in position by studs 49 and securely clamped to the drum by a clamping bar 51 attached to clamping posts 52, which are rigidly secured to the drum. It will be manifest viewing Fig. 7, that upon loosening the nuts 53 on the outer ends of the posts, the clamping bar 51 may be removed permitting removal of the casting 48, and that a rough casting may be secured on the drum by the inverse action. In the present machine, the finished castings are removed as they come up at the back of the machine and they are immediately replaced by rough castings. The surfaces 54 and 55 exposed at the ends of the motor casting will be milled.

Each side housing carries at its front edge vertical guideways 56 extending substantially from top to bottom thereof, and upon the guideways of each housing is mounted with capacity for vertical adjustment, a pair of spindle heads or saddles designated generally by characters 57 and 58. These spindle heads may be of any suitable or preferred construction, and in the present case are of conventional design best shown in Fig. 6. From this it will be seen that each head carries a cutter holder spindle 59, through the agency of a spindle adjusting sleeve 61 and a driving sleeve 62, the latter of which is equipped with a gear 63 in mesh with a pinion 64 splined on a vertical driving shaft. Each spindle head may be independently vertically adjusted on the ways 56 by means of its respective nuts 65 acting on a screw rod 66 operable between its spindle head and a housing bracket 67, as will be readily understood. Each head may be rigidly secured to the ways by tightening the clamping nuts 68. The cutter spindles may be axially adjusted by turning the pinion shafts 69 to move the cutters toward and from the work. The driving pinions 64 for the spindles on the left hand housing are driven by a vertical shaft 71, and those at the right hand side of the machine by the shaft 72. These spindle driving shafts journaled at their upper ends in the bearing brackets 73 bolted to the top plate 12 have respectively fixed to their upper ends worm wheels 74 meshing with worms 75 fixed to a driving shaft 76 journaled at its ends in bearings 77 and intermediate its ends in a suitable bearing on the top plate. At present, each bearing 77 is formed integral with a bearing bracket 73 which latter also provides a worm wheel casing. The shaft 76 is driven by gears 79, shaft 78 and gears 70, which latter connect with the driving train mentioned above. By arranging the spindle-drive bevel pinions 64 for the upper and lower spindles above and below the spindle axes, the spindles will be revolved in opposite directions as indicated in Fig. 4, the upper spindles turning in a counterclockwise direction and the lower in a clockwise direction. This particular drive for the spindles is not essential to the present invention, especially inasmuch as under the present spindle arrangement the roughing and finishing cutters operate separately on each work-piece. By the provision of appropriate gearing the cutters may be driven in the same direction. Each spindle is equipped with a surface milling cutter of any suitable construction, preferably of the inserted tooth type. The cutters are shown diagrammatically in the drawings, the upper cutters 81 performing the initial or roughing operation and the lower cutters 82 the finishing operation.

From the foregoing, the operation of the machine will be readily understood. The work carrying drum 17 and the cutters will be continuously revolved in the proper directions and at the requisite speeds to feed the castings in succession between the opposed pairs of roughing and finishing cutters and thence through a loading an unloading station. The mechanism for driving the drum and cutter spindles is arranged in a very efficient manner so that the power will be equally transmitted to the ends of the drum shaft and through the several spindles, and such mechanism is further arranged in such compact relation that the machine occupies but a minimum floor area. Attention is further directed to the fact that the several co-operating instrumentalities, viz., the drum, cutter spindles and driving mechanism therefor, are arranged in novel co-operation with the side housings, so as to insure thorough rigidity and strength for the heavy-duty operation required of a machine of this character. When work-pieces of different size and proportions from that shown are to be milled, it is preferred that the sectional drum shall be removed and substituted by another equipped with the requisite fixtures for holding the work-piece in position. In such event, the spindle heads will be elevated or lowered as the case may be, on the side housings, so that the cutters will cover the surfaces to be milled.

In the operation, the work-pieces are loaded and unloaded at the left hand side of the machine, viewing Fig. 4, by one or more operators, as the case may require. It will now be observed that by reason of the general design of this machine, unskilled labor may be employed simply for loading and unloading the work-pieces at one side of the machine, and that the cutters and spindles are positioned at the opposite side of the machine away from the loading station. This gives free access to the cutters and spindles at the side remote from the loading operations so that the inspectors, maintenance men or tool men as they are sometimes called, may watch and attend to the cutters and spindles without interference with the loading operations.

The term "drum type" is used to distinguish from prior well known types of milling machines, the type of milling machine disclosed herein, which is characterized generally stated, by a base carrying spaced upright housings between and upon which is revolubly mounted a work-carrying drum and upon which is further mounted any suitable number of milling cutter spindles adapted to mill the work-pieces as they are carried in succession by the drum past the cutters, and suitable driving mechanism for the drum and spindles preferably including a motor and reduction gearing mounted on a top structure rigidly joining the upper ends of the housings. The term "drum" in connection with the work carrier is used broadly in the claims and signifies any suitable structure for carrying the work-pieces in circumferentially spaced relation and adapted to be rotated.

It is believed that the foregoing conveys a clear understanding of the objects and principles of my invention, and while I have illustrated in the drawings but a single working embodiment thereof, it should be understood that considerable change might be made in the design and arrangement of parts without departing from the spirit and scope of the invention as expressed in the appended claims, in which—

I claim:

1. In a milling machine, the combination of a bed plate, laterally spaced upright housings thereon, means for rigidly connecting the upper ends of the housings, a work table revolubly mounted between and upon the housings and constructed for carrying the work-pieces in circumferentially spaced relation, and a pair of spindle heads mounted on each housing, one equipped with a roughing and the other with a finishing surface milling cutter, the cutters being so arranged in opposed relation as to successively mill end surfaces of the work-pieces passed between the cutters by rotation of the table.

2. A milling machine of the character described comprising a bed plate, laterally spaced upright housings mounted on the bed plate, a top plate connecting the upper ends of the housings, a drum shaft interposed between and journaled at its ends in bearings in said housings, a drum mounted on the shaft between the housings for carrying in circumferentially spaced relation a plurality of work-pieces, and a face milling cutter mounted on each housing, said cutter being disposed in substantially co-axial relation and adapted to simultaneously surface-mill the opposite ends of each work-piece as it is moved between the cutters by rotation of the drum.

3. A milling machine of the character described comprising a bed plate, laterally spaced upright housings mounted on the bed plate, a top plate connecting the upper ends of the housings, a drum shaft interposed between and journaled at its ends in bearings in said housings, a drum mounted on the shaft between the housings, for carrying in circumferentially spaced relation a plurality of work-pieces, a vertical way on each housing, and a spindle head mounted for vertical adjustment on each of said ways and equipped with a face milling cutter, said cutters being adapted to simultaneously surface mill the opposite ends of each work-piece as it is moved therebetween by rotation of the drum.

4. In a milling machine of the character described, the combination of a bed plate, laterally spaced upright housings thereon, a main drum shaft horizontally mounted in bearings in said housings and extending beyond the outer sides thereof, mechanism for revolving said shaft, including a worm gear fixed to each end of the shaft, means on the shaft intermediate the housings for carrying a plurality of work-pieces in circumferentially spaced relation, and a horizontally disposed spindle head mounted on each housing and equipped with a face milling cutter, said cutters being adapted to surface mill opposite end portions of the work-pieces as they are moved therebetween by rotation of said shaft.

5. A milling machine of the character described comprising a base having laterally spaced upright housings equipped with vertical ways disposed substantially in alignment transversely of the machine, a shaft interposed between and journaled in bearings in said housings, means on said shaft intermediate the housings for carrying a plurality of work-pieces in circumferentially spaced relation, a pair of spindles adjustably mounted one above the other on said ways of each housing, and a roughing surface milling cutter carried by one of the spindles on each housing and a finishing surface milling cutter carried by the other spindle on each housing, whereby each work-piece, as it is carried between said cutters by rotation of the shaft, will be milled at both ends by a pair of roughing cutters and a pair of finishing cutters.

6. A drum type milling machine comprising laterally spaced upright housings, a drum interposed between and supported by bearings in said housings and adapted to carry a plurality of work-pieces in circumferentially spaced relation, and a pair of spindles mounted one above the other on each housing, companion spindles being disposed in substantially co-axial relation, one spindle on each housing being equipped with a roughing surface milling cutter and the other with a finishing surface milling cutter whereby the work-pieces will be successively moved between a pair of roughing and finishing surface milling cutters by rotation of the drum.

7. A milling machine comprising laterally spaced upright housings, a main drum shaft interposed between and journaled in bearings in said housings, a sectional drum, the sections of which are detachably secured to said shaft between the housings and are shaped to provide a plurality of peripheral work supports, and a cutter spindle mounted on each housing for carrying a face milling cutter, whereby said cutters will surface-mill opposed faces of the work as it is moved between the cutters by rotation of the drum.

8. A continuous milling machine of the character described comprising a base, laterally spaced upright housings on the base, a top plate joining the housings, a work-carrying drum revolubly mounted between and upon said housings, a spindle head vertically adjustable on each housing and adapted to carry a milling cutter between which cutters the work is moved by rotation of the drum, a vertical shaft for driving each cutter spindle, and motor driven mechanism on the top plate for driving said spindle-driving shafts.

9. A continuous milling machine of the character described comprising a base, laterally spaced upright housings on the base, milling cutters carried by said housings, a top plate joining the housings, a work-carrying drum revolubly mounted between and upon said housings and adapted to carry work between said cutters, a vertical shaft for driving each cutter spindle, a vertical shaft for driving each end of the drum shaft, and motor driven mechanism on the top plate for driving all of said vertical shafts.

10. In a milling machine of the character described, a pair of laterally spaced upright housings, a main drum shaft journaled at its end portions in bearings in said housings, a sectional work-carrying drum detachably mounted on and connected to said shaft between the housings and constructed to carry a plurality of circumferentially spaced workpieces, a nut engaged with the shaft for holding said drum against lengthwise movement with respect to the shaft, and spindle heads carrying milling cutters adapted to surface mill the work-pieces carried therebetween by rotation of said shaft.

11. In a milling machine of the character described, the combination of a work table revoluble about a fixed axis and equipped for carrying a plurality of work-pieces in circumferentially spaced relation, a pair of spindle heads at each end of the work-table having their spindle axes parallel with the axis of the work-table and spaced radially therefrom so as to intersect the path of the work-pieces, roughing and finishing surface milling cutters for each pair of spindles and a rigid housing structure supporting each pair of spindles in operative relation to the work table and revolubly supporting said work table from beyond each end thereof.

12. A drum type continuous milling machine comprising a base, side housings and a top plate structure rigidly united, a work-carrying drum revoluble between and upon the housings for carrying work-pieces in circumferentially spaced relation, a milling cutter mounted on each housing at the inner side thereof, and mechanism for continuously revolving the drum and cutters so that the work-pieces will be carried in succession between and be milled by the cutters.

13. A drum type milling machine comprising a base, spaced upright housings rigid on the base, a work-carrying drum supported for rotation upon and between the housings and adapted for carrying work-pieces in circumferentially spaced relation, means for revolving the drum to carry the work-pieces in succession past a loading station at one side of said housings, a milling cutter spindle mounted on each housing at the opposite side thereof and accessible from said opposite side, and means for driving the spindles.

14. A drum type milling machine comprising a base, spaced upright housings rigid on the base, a work-carrier revolubly mounted on said housings and constructed for carrying work-pieces between the housings in circumferentially spaced relation, milling cutters mounted on each housing and adapted to be positioned at different vertically spaced locations thereon, and driving mechanism for revolving the work carrier and the spindles.

15. A milling machine of the character described comprising a base, spaced upright housings rigid on the base and rigidly joined at their upper ends, a work-carrier revolubly mounted on said housings and constructed for carrying work-pieces between the housings in circumferentially spaced relation, the work-carrier being adapted to be loaded at one side of the machine, cutter spindles mounted on the housings adjacent to the opposite side of the machine and adapted for carrying cutters accessible from this side only of the machine, and mechanism for revolving the work-carrier and spindles.

16. A drum type milling machine comprising a base, spaced upright housings rigid on the base and each having vertical ways at one side, a top structure rigidly uniting the upper ends of said housings, a work-carrying drum interposed between and revolubly mounted upon said housings and adapted for carrying work-pieces in circumferentially spaced relation, a spindle saddle vertically adjustable on the ways on each housing, a cutter spindle journaled in each saddle and adapted for carrying a milling cutter, driving mechanism mounted on said top structure, and a driving connection between said mechanism and drum and another between said mechanism and the spindles.

17. A milling machine comprising a base, spaced upright housings rigid on the base, a top structure rigidly joining the upper ends of said housings, a work-carrier revolubly mounted on said housings and adapted for carrying work-pieces between the housings in circumferentially spaced relation, milling cutter spindles mounted on the housings and adapted for carrying cutters adjacent to the work carrier, a motor mounted on said top structure, and driving connections between the motor and the work carrier and spindles including reduction gearing carried by the top structure.

18. A drum type milling machine comprising a base, spaced upright housings rigid on the base, a top structure rigidly uniting the upper ends of the housings, a work-carrying drum interposed between and revolubly mounted on said housings, a cutter spindle mounted on one of the housings and adapted for carrying a milling cutter in position to mill the work-pieces carried by the drum, and mechanism mounted on the top structure for revolving the drum and said spindle.

19. A drum type milling machine comprising a base, spaced upright housings rigid on the base, a top structure rigidly connecting the upper ends of the housings, a work-carrying drum interposed between and journaled on bearings in said housings, said drum being adapted to carry circumferentially spaced work-pieces past a loading station at one side of the machine, a milling cutter spindle mounted on each housing at the side opposite said loading station with its cutter-carrying end adjacent to the drum, and mechanism mounted on said top structure for driving the drum and spindles.

20. A drum type milling machine comprising a base having spaced upright side housings rigid thereon and rigidly joined at their upper ends by a top structure, a work-carrying drum located between and supported by the housings, said drum being adapted to carry work-pieces in circumferentially spaced relation and to be revolved about a horizontal axis for carrying the work-pieces successively from a loading station at one side of the machine and past milling cutters at another station on the machine, cutter spindles mounted on the housings and adapted to carry milling cutters intermediate the housings, and mechanism for revolving the work-carrying drum and the cutter spindles.

21. A drum type milling machine comprising a base having spaced upright side housings rigid thereon and rigidly joined at their upper ends by a top structure, a work-carrying drum located between and supported by the housings, said drum being adapted to carry work-pieces in circumferentially spaced relation and to be revolved about a horizontal axis for carrying the work-pieces successively from a loading station at one side of the machine past milling cutters at another station on the machine, a pair of cutter spindles mounted on each housing at the opposite side of the drum axis from said loading station, one spindle being above and the other below a horizontal plane intersecting the drum axis, roughing cutters carried by the spindles at one side of said plane, and finishing cutters carried by those at the other side.

22. A drum type continuous milling machine comprising a base, spaced upright side housings rigid on the base, a top structure rigidly joining the upper ends of the housings, a work carrying drum structure located between said housings and supported thereon and adapted to rotate about a horizontal axis, said housings having vertical ways at one side, spindle saddles mounted on the ways on each housing and each equipped with a cutter spindle, means for clamping the spindle saddles at different locations on said ways, and driving mechanism mounted on the top structure and connected with the drum and spindles for continuously revolving the same.

23. A milling machine, comprising a rigid frame structure including a pair of spaced upright columns, surfacing tools mounted on said columns in opposed relation, and a work carrier rotatably carried by and disposed between said columns, so that one portion thereof is exposed for loading and unloading purposes, while another portion thereof is carrying work between said opposed tools.

24. A milling machine, comprising a rigid frame structure including a pair of spaced upright columns, surfacing tools mounted on the front faces of said columns, and a drum-shaped work carrier disposed between said columns and mounted to revolve about a horizontal axis intersecting said columns, the rear portion of the periphery of said carrier being exposed for loading and unloading purposes while work mounted on the opposite portion thereof is being carried between and subjected to the action of said tools.

25. A milling machine, comprising a rigid frame structure including a pair of spaced upright columns, a work carrying drum disposed between said columns and mounted to revolve about a horizontal axis intersecting said columns, and a plurality of rotatable surfacing tools mounted upon the front faces of said columns in proximity to the periphery of said drum with their axes of rotation parallel to the axis of said drum, said drum being adapted to convey the work between the tools on the respective columns whereby work surfaces adjacent each end of the drum are simultaneously milled.

JOHN R. JOHNSON.